United States Patent
Uchida et al.

[11] Patent Number: 5,855,952
[45] Date of Patent: Jan. 5, 1999

[54] METHOD OF PRODUCING PATTERNED SHAPED ARTICLE USING AN ANGLE OF REPOSE FORMATION MEMBER

[75] Inventors: Hiroshi Uchida, Ashikaga; Mituhiro Onuki, Kiryu; Hideo Watanabe, Ashikaga, all of Japan

[73] Assignee: CCA Inc., Tokyo, Japan

[21] Appl. No.: 883,896

[22] Filed: Jun. 27, 1997

Related U.S. Application Data

[63] Continuation of Ser. No. 424,383, filed as PCT/JP94/01435, Aug. 31,1994, published as WO95/06551 Sep. 3, 1995, abandoned.

[30] Foreign Application Priority Data

Aug. 31, 1993 [JP] Japan ..................................... 5-237258

[51] Int. Cl.$^6$ ................. B05D 1/26; B05D 1/36
[52] U.S. Cl. .................. 427/180; 427/195; 427/198; 427/202; 264/101; 264/112
[58] Field of Search .................. 427/180, 196, 427/195, 201, 202, 203, 198; 434/82; 446/70; 264/101, 112, 122, 138, 241, 245; 404/98

[56] References Cited

U.S. PATENT DOCUMENTS

| | | |
|---|---|---|
| 1,248,532 | 1/1917 | Noyes . |
| 3,852,145 | 12/1974 | Kloweit . |
| 4,076,567 | 2/1978 | Yoshikawa et al. ..................... 156/219 |
| 4,455,752 | 6/1984 | Koulouras . |
| 5,248,523 | 9/1993 | Brunel et al. ........................... 427/181 |

FOREIGN PATENT DOCUMENTS

| | | |
|---|---|---|
| 0 586 257 | 3/1994 | European Pat. Off. . |
| 14209 | 10/1911 | United Kingdom . |
| 2 023506 | 1/1980 | United Kingdom . |
| 2 215 266 | 9/1989 | United Kingdom . |
| 2215266 | 9/1989 | United Kingdom . |

*Primary Examiner*—Michael Lusignan
*Assistant Examiner*—Fred J. Parker
*Attorney, Agent, or Firm*—Oblon, Spivak, McClelland, Maier & Neustadt, P.C.

[57] ABSTRACT

A method for producing a patterned shaped article. A prescribed amount of dry particles are supplied onto a position on a base surface. The particles are applied according to a pattern which is desired. A formation device is used to form the particles into a course which corresponds to the pattern desired. The side face of the device has a constant produced angle slope. A different type of dry particles is then supplied onto the remaining portion of the base surface. The particles are allowed to set into an integral mass either as they are or after being overlaid with backing.

4 Claims, 10 Drawing Sheets

FIG.7
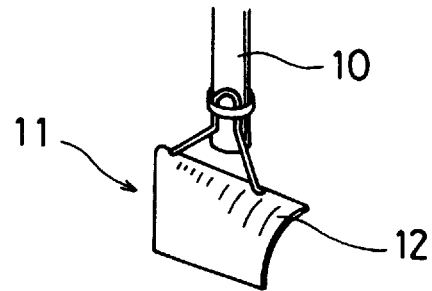
FIG.8(a)     FIG.8(b)
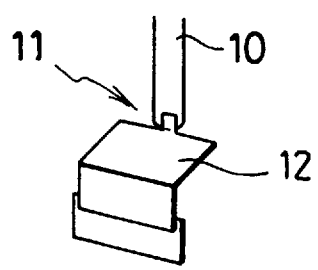 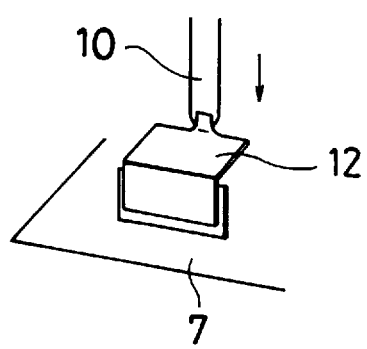
FIG.8(c)
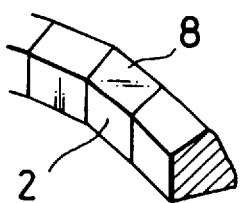

FIG. 9
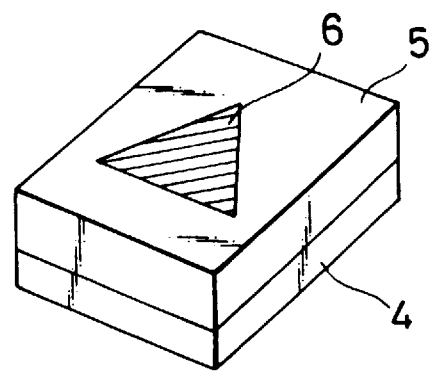
FIG.10(a)     FIG.10(b)
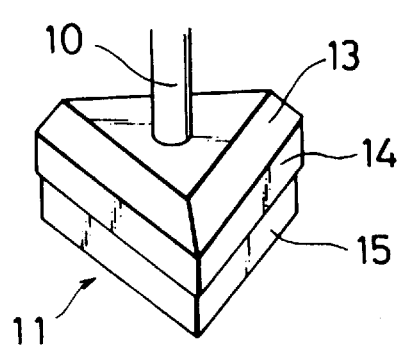 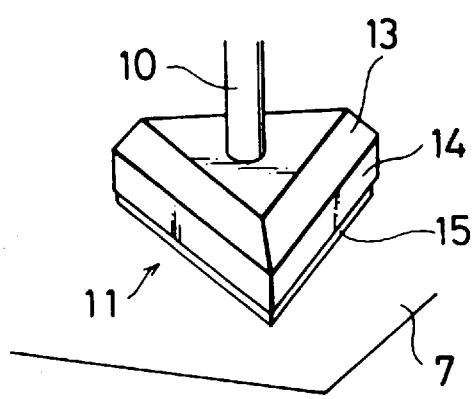
FIG.11
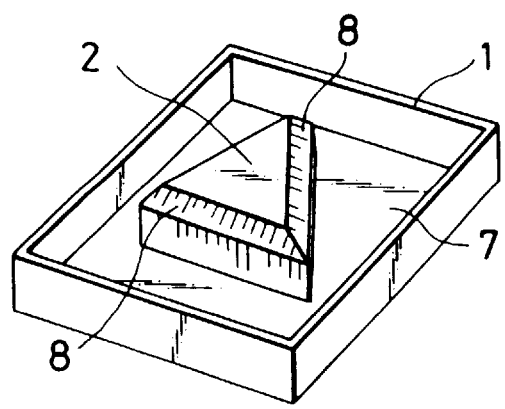

FIG.17(a)  FIG.17(b)
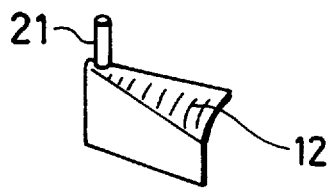
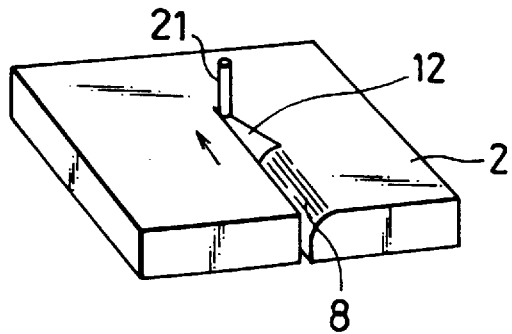
FIG.18(a)  FIG.18(b)
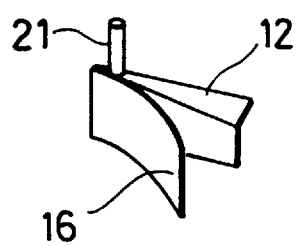
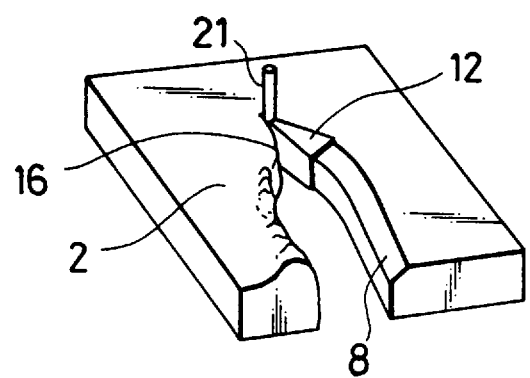
FIG.19(a)  FIG.19(b)
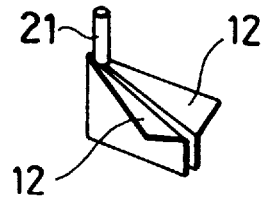
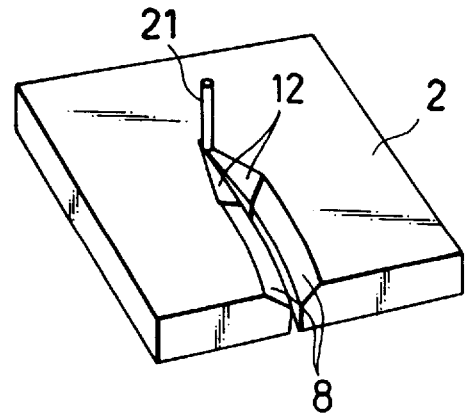

FIG.25(a)   FIG.25(b)   FIG.25(c)
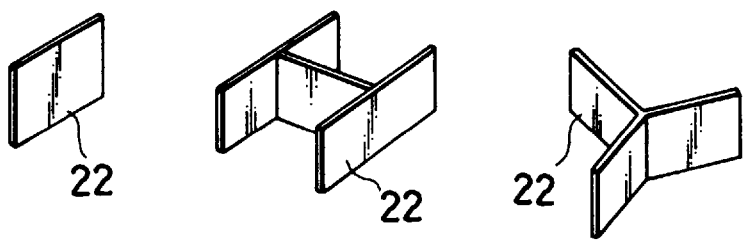
FIG.25(d)   FIG.25(e)
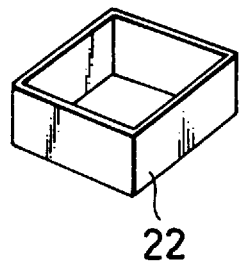   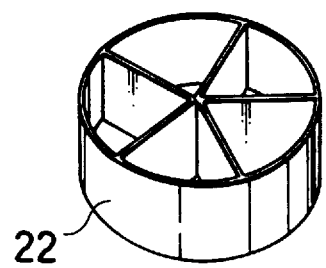

METHOD OF PRODUCING PATTERNED SHAPED ARTICLE USING AN ANGLE OF REPOSE FORMATION MEMBER

This application is a continuation of application Ser. No. 08/424,383, filed on Apr. 27, 1995, now abandoned, which is a 371 of PCT/JP94/01435 filed Aug. 31, 1994 published as WO 95/06551 Sep. 3, 1995.

TECHNICAL FIELD

This invention relates to a method for producing patterned concrete shaped articles, patterned artificial stone shaped articles, patterned raw products for sintering into ceramic shaped articles, patterned ceramic shaped articles, patterned metal shaped articles, patterned impasto shaped articles, patterned plastic shaped articles, patterned shaped foodstuffs and other such patterned shaped articles, using a particle feeder and a formation member.

BACKGROUND ART

Up to now the only way available for providing a part of a surface, such as of paving blocks, with a pattern indicating a pedestrian crossing, a stop sign or other such traffic sign or for providing the entire surface of the blocks with a pattern has been to paint the surface with a coating material such as paint or to inlay the desired pattern.

Since the patterns painted on a part or all of the surface of paving blocks are exposed to abrasion such as from the footwear of pedestrians walking on the blocks, and the tires of vehicles driving over them, they quickly wear off and have to be redone at frequent intervals. The amount of labor involved in this work is considerable. Where the pattern is formed by inlaying, the work itself is troublesome and very costly.

The present inventors previously proposed methods for readily producing various types of patterned shaped articles which do not lose their surface patterns and do not become unsightly even when exposed to surface abrasion, using at least one means for holding the material selected from among an auxiliary form corresponding to the pattern to be expressed (in Japanese Patent Laid-Open Application Nos. 4-105903, 5-38707, 5-38708 and 5-238767), a cell body consisting of cylindrical bodies of a set height (in Japanese Patent Laid-Open Application Nos. 4-140104, 4-139083, 5-847157 and 5-84714), and a bristling body (in Japanese Patent Laid-Open Application Nos. 4-345803, 5-324068, 5-237816 and 5-237821).

The object of the present invention is to provide a method of producing patterned shaped articles with clearly defined patterns readily formed by pattern courses of prescribed thickness.

DISCLOSURE OF THE INVENTION

For achieving the aforesaid object, the present invention provides a method of producing a patterned shaped article comprising supplying a prescribed amount of dry particles onto a position on a base surface corresponding to a pattern to be expressed, using an angle of repose formation member to form the particles into a particle course corresponding to the pattern to be expressed with a side face having an angle of repose slope, supplying a prescribed amount of a different type of dry particles onto a remaining portion of the base surface, and allowing the particles to set into an integral mass, either as they are or after being overlaid with a backing course.

The present invention also provides a method of producing a patterned shaped article comprising forming a dry particle course on a base surface, inserting a formation member in the particle course and forming at a portion of the particle course a section corresponding to a pattern to be expressed having an essentially constant produced angle slope, removing the particle course on a side facing said section, charging a cavity thus formed with a different type of dry particles and allowing the particles to set into an integral mass, either as they are or after being overlaid with a backing course.

Previously it has only been possible to produce clearly defined patterns by using auxiliary forms and the like. In accordance with the present invention, a formation member is used to form in a particle course a side face provided with a portion that slopes at an essentially constant produced angle. This enables a clearly defined pattern to be expressed with a clear boundary, and supplying different dry particles does not result in collapse of the particle course.

The formation of the essentially constant produced angle slope stabilizes particle courses, which provides a much greater degree of freedom with respect to the timing of the charging, and with respect to charging randomly blended particles, this ability to choose the timing makes possible a wide range of pattern expression.

The essentially constant produced angle means the angle of the upper slope of layer of particles compressed using an instrument is which the upper particles of the layer do not slide down.

The above and other features of the present invention will become apparent from the following description made with reference to the drawings.

BRIEF DESCRIPTION OF THE DRAWINGS

FIGS. 7 is a perspective view of a second example of a constant produced angle formation member used in the invention.

FIG. 8(a) is a perspective view of a third example of a formation member used in the invention.

FIG. 8(b) shows the static angle formation member of FIG. 8(a) pressing on the base surface.

FIG. 8(c) is a perspective view showing a portion of a particle course having a side formed into a constant produced angle by the formation member of FIG. 8(a).

FIG. 9 is a perspective view showing a second example of a shaped article produced according to the invention.

FIG. 10(a) is a perspective view of a fourth example of a formation member used to form the article of FIG. 9.

FIG. 10(b) shows the formation member of FIG. 10(a) pressing on the base surface.

FIG. 11 is a perspective view showing the constant produced angle sides of the triangular used to form the pattern in the shaped article of FIG. 9.

FIG. 17(a) is a perspective view of a sixth example of a formation member used in the invention.

FIG. 17(b) is a perspective view showing the formation in the particle course of a side face having a constant produced angle, by using the formation member of FIG. 17(a).

FIG. 18(a) is a perspective view of a seventh example of a formation member used in the invention.

FIG. 18(b) is a perspective view showing the formation in the particle course of a side face having a static, by using the static angle formation member of FIG. 18(a).

FIG. 19(a) is a perspective view of an eighth example of a formation member used in the invention.

FIG. 19(b) is a perspective view showing the formation in the particle course of a side face having a constant produced angle, by using the formation member of FIG. 19(a).

FIG. 25(a) to (e) are perspective views showing five examples of end stops that can be used in the method of the invention.

BEST MODE FOR CARRYING OUT THE INVENTION

Figure 1:
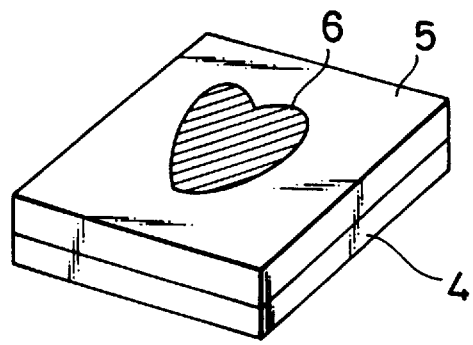
FIG. 1 is a perspective view showing a first example of a shaped article produced according to the invention.

While for convenience the following description will be limited to the examples shown with reference to FIGS. 1 to 24, the invention is capable of producing a variety of other patterns by varying the configuration of the angle of repose formation member used to produce patterned shaped articles. FIG. 1 shows an example of a shaped article having a heart pattern and FIG. 9 shows an example of a shaped article with a triangular pattern.

Although the particles used to form a particle course on a base surface, and the particles and different type of particles supplied onto the base surface are dry, they may have absorbed one or more of water, oil, lubricant-bonding agent, solvent, setting agent or plasticizer, insofar as they are not kneaded with water, oil, lubricant-bonding agent, solvent, setting agent or plasticizer and are in a dry state readily broken up for supply.

Figure 2:
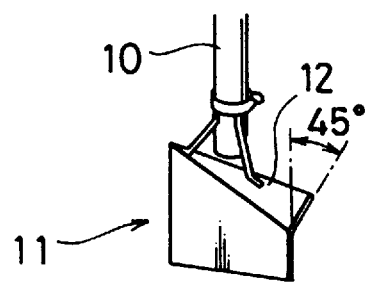
FIG. 2 is a perspective view of a first example of a formation member used to form the article of FIG. 1.
Figure 3:
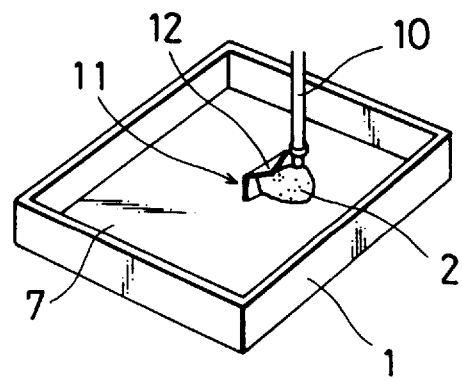
FIG. 3 is a perspective view illustrating the first stage in the formation of the shaped article of FIG. 1.
Figure 4:
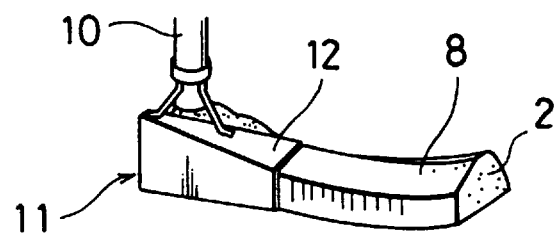
FIGS. 4 illustrates constant produced angle formation of supplied particles.

FIG. 1 shows a shaped article 5 having a heart-shaped pattern 6. To form this shaped article 5 in accordance with a first method of the invention, a prescribed amount of dry particles 2 are supplied to a location on a base surface 7 corresponding to the pattern to be expressed. A formation member 11 is used to provide the dry particles 2 with a side face having a constant produced angle slope 8, a different type of dry particles 3 are supplied to the remaining part of the base surface, and the particles are allowed to set into an integral mass. With reference to FIGS. 2 and 3, the angle of repose formation member 11 detachably affixed beneath a supply port 10 is pressed onto the base surface 7 constituted by the bottom plate of a form 1. As the dry particles 2 pour down from the supply port 10, the formation member 11 is moved together with the supply port 10 whereby the dry particles 2 are shaped into a narrow course having on an upper surface a slope 8 formed by the smoothing action of the angle of repose formation member 11.

The formation member 11 has a smoothing portion 12 consisting of a long, narrow piece of thin plate with a triangular portion bent at roughly 45 degrees to the remaining vertical portion along a line extending from the upper front edge, with respect to the direction of advance, to a point vertically midway along the rear edge. The smoothing portion 12 has a high front edge and a low rear edge. As a result, as the formation member 11 is detachably affixed so the front end is beneath a supply port 10, by moving the formation member 11 pressing on the base surface 7 while dry particles 2 are being supplied onto the base surface 7 from the port 10 to form a narrow particle course, the particles are pressed downwards by the smoothing portion 12, which is lower and wider toward the rear end, producing a narrow course of particles having a constant produced angle slope 8 formed on an upper surface portion.

Figure 5:
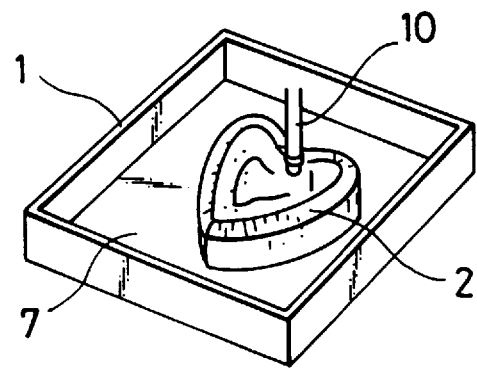
FIG. 5 is a perspective view showing the point of completion of an outline of a heart shaped pattern of a shaped article.
Figure 6:
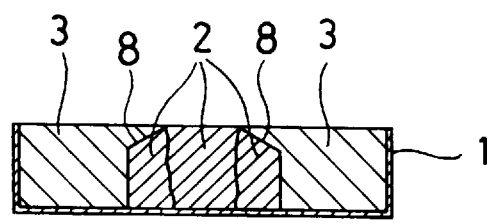
FIGS. 6 is a sectional view of the shaped article of FIG. 1.
Figure 20:
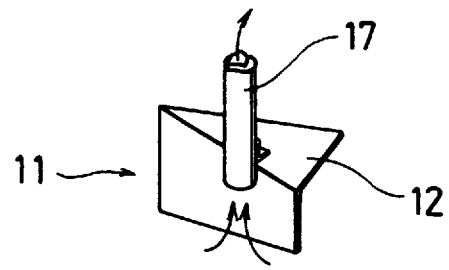
FIG. 20 is a perspective view of a ninth example of a formation member used in the invention.
Figure 21:
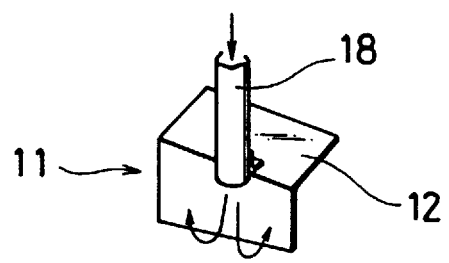
FIG. 21 is a perspective view of a tenth example of a formation member used in the invention.

To form a heart-shaped outline using the narrow particle course thus provided with a constant produced angle slope 8, with dry particles 2 being dispensed onto the bottom plate of the form 1 from the supply port 10, the supply port and the formation member 11 are moved to form one half of the heart, starting from the midpoint at the top and moving around the periphery to the pointed lower end. When the lower end is reached, the supply of particles is stopped. The direction of advance of the formation member 11 is changed, the supply of particles is restarted and the other half of the heart is formed, ending with the particle course being run into the initially formed portion, as shown in FIG. 5. The supply port 10 and formation member 11 are then removed from the base surface 7. The interior of the heart outline is then filled with the same type of particles and the remaining portion of the form 1 is filled with a prescribed amount of a different type of dry particles 3. This completes the shaped article formed as a dry particle course containing a heart-shaped pattern 6, having the type of cross-section shown in FIG. 6. The particles are then allowed to set into an integral mass, either as they are or after being smoothed and/or overlaid with a backing course 4, if required. While in this example the pattern is shown as being expressed using a formation member having a triangular static angle smoothing portion with an elevation differential that is bent at 45 degrees, the formation member is not limited thereto and can be used to express a variety of patterns by using formation members of various configurations and materials, and by varying the way the formation members are moved on the base surface. Examples of such variations include the smoothing portion 12 shown in FIG. 7 which has been given a gentle curvature that matches the line of stress of the particle course, and the formation member arrangement shown in FIG. 8 in which the vertical portion is vertically extendible and the sloping upper part forming the smoothing portion 12, which has no elevation differential, is used to press down the particles being supplied from the supply port 10 while at the same time being moved to thereby form a narrow course having a constant produced angle slope 8. The surface can be formed in various ways, such as by pressing down on the particles (FIG. 8(a)), shaping the particle course by moving the forming member horizontally (FIG. 4), or by removing particles (FIG. 20). Further variations can be achieved by using combinations of these methods. While it is preferable to use a formation member whose height is about equal to the thickness of the course of supplied particles, any configuration may be used that enables a constant produced angle slope to be formed.

The formation of the static has the effect of stabilizing the particle course forming the pattern outline, so charging of particles inside and/or outside the outline does not have to done immediately. Particles can be charged by hand or by mechanical means. The method and timing of the charging can be decided based on work efficiency considerations and the like.

FIG. 9 shows a shaped article 5 having a triangular pattern 6. This shaped article 5 is formed in accordance with the first method of the invention using a formation member 11 comprising a hollow, flat-topped, triangular pyramid 13, a skirt 14 extending down from the periphery of the pyramid 13, and a vertically moveable triangular form 15 that can fit up inside the skirt 14 but is normally extended downward by the force of a spring. A particle supply port 10 is connected to a hole in the top of the pyramid 13. The formation member 11 is positioned over the bottom plate of the form 1 with the lower edge of the moveable form 15 in contact with the base surface 7. Next, the interior of the formation member 11 is filled with particles 2 from the supply port 10 and the formation member 11 is then pressed downwards. This brings the skirt 14 down against the resistance of the spring, causing the particles inside the formation member 11 to be compressed by the inner surface of the pyramid 13. The formation member 11 is then removed from the form 1, leaving a triangular dry particle course 2 the upper part of which slopes at the angle of repose, as shown in FIG. 11. The remaining portion of the form 1 is filled with a prescribed amount of a different type of dry particles 3. This completes the formation of the shaped article constituted as a dry particle course containing a triangular pattern 6, having the same type of cross-section as the one shown in FIG. 6. The particles are then allowed to set into an integral mass, either as they are or after being smoothed and/or overlaid with a backing course 4, if required. The invention is not limited to the arrangement of this example in which the pattern is produced using a formation member having a triangular pyramidal configuration. Instead, different patterns can be expressed by varying the configuration and materials of the formation members, and the way formation members are pressed onto the base surface and moved.

The formation of the constant produced angle has the effect of stabilizing the particle course forming the pattern outline, so charging of particles inside and/or outside the outline does not have to done immediately. Particles can be charged by hand or by mechanical means. The method and timing of the charging can be decided based on work efficiency considerations and the like.

Figure 12:
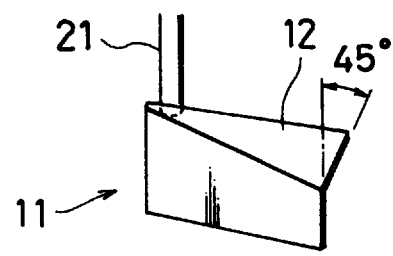
FIG. 12 is a perspective view of a fifth example of a formation member used in the invention.
Figure 13:
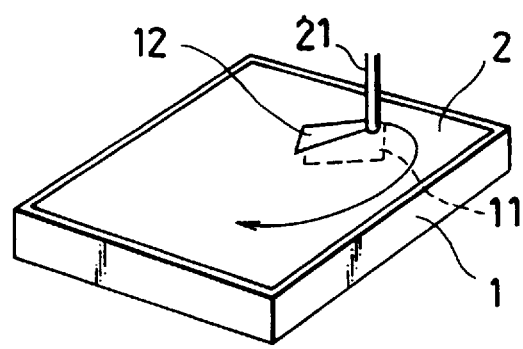
FIG. 13 is a perspective view showing the initial insertion of the formation member of FIG. 12 to form the article of FIG. 1.
Figure 14:
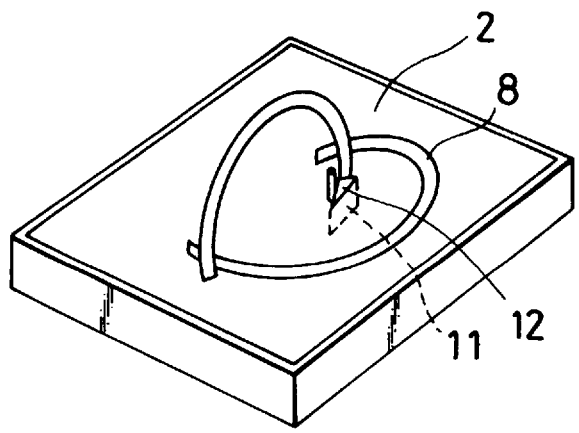
FIG. 14 is a perspective view showing when the formation member of FIG. 12 has been moved in a heart outline in the particle course.
Figure 15:
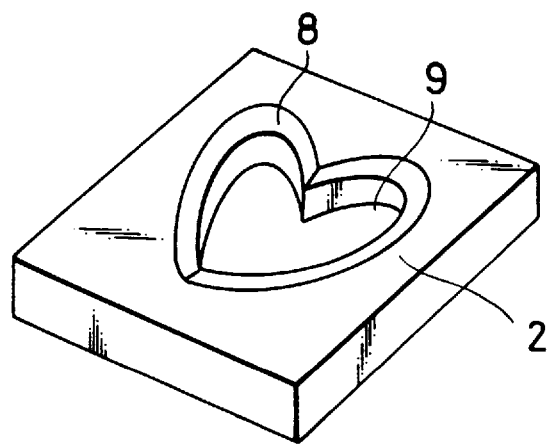
FIG. 15 is a perspective view showing a heart shaped cavity formed with a constant produced angle in the particle course.
Figure 16:
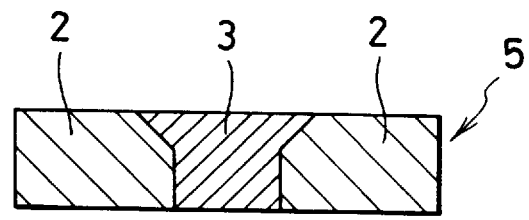
FIG. 16 is a sectional view of a shaped article formed by charging the heart shaped cavity of FIG. 15 with a different type of particles.

To form this shaped article 5 heart-shaped pattern 6 shown in FIG. 1 in accordance with a second method of the invention, a formation member 11 is inserted into a course of dry particles 2 on a base surface 7 to form a side face with an angle of repose slope 8 surface corresponding to the pattern in the particle course. The particle course on the side facing the side face is then removed and the cavity 9 thus formed is charged with a different type of dry particles 3. The particles are all then allowed to set into an integral mass. Specifically, the formation member 11 having a smoothing portion 12 shown in FIG. 12 is used, which has the same configuration as the one shown in FIG. 2. A dry particle course 2 is formed on a base surface constituted by the bottom plate of a form 1. The formation member 11 is inserted into the particle course 2 at a point corresponding to the midpoint at the top of the heart, and is pressed down into contact with the base surface (FIG. 13). The formation member 11 is then moved around through the particle course towards the pointed lower end (FIG. 14). This movement of the formation member 11 causes the trailing edge portion of the smoothing portion 12 to press down the particles like a trowel, forming a sectional configuration having a sloping portion along one half of the periphery of the heart shape. When the lower end of the heart is reached the formation member 11 is withdrawn from the particle course 2, reoriented, inserted back into the particles and moved up around the other half of the heart, merging at the end with the starting portion. The formation member 11 is then removed, and the portion of the particle course inside the heart-shaped pattern 6 is removed by suction, blowing or other such suitable method, either while forming a constant produced angle slope 8 or, when there is no collapse of the shape, at an appropriate time. The cavity 9 thus formed with a constant produced angle slope 8 at its upper edge (FIG. 15) is then charged with a different type of dry particles 3 to complete the particle course shaped article 5 with a heart-shaped pattern 6 having the section shown in FIG. 16. The particles are then allowed to set into an integral mass, either as they are or after being smoothed and/or overlaid with a backing course, if required. While in this example the formation member 11 shown in FIG. 12 having a triangular smoothing portion with an elevation differential is used to express a heart pattern, the expression is not limited thereto but can include a variety of patterns expressed by using formation members of various configurations and materials, and by varying the way the formation members are moved on the base surface. Examples of such variations include forming the constant produced angle slope 8 using the triangular smoothing portion 12 shown in FIG. 17 which has been given a gentle curvature that matches the line of stress of the particle course; the formation member arrangement shown in FIG. 18 in which a vertical scraper 16 is affixed to the vertical portion of the formation member 11 to scrape away particles; the configuration of FIG. 19 shaped like the wings of a paper airplane that can form a constant produced angle slope 8 on both sides along the direction of advance; the arrangement of FIG. 20 in which the vertical portion of the angle of repose formation member 11 has an integrally affixed suction port 17 that is connected to an aspirator (not shown) so that at substantially the same time as the constant produced angle is being formed the particles of the particle course on the side facing the constant produced angle slope thus formed can be removed by suction; and the arrangement of FIG. 21 in which the vertical portion of the formation member 11 has an integrally affixed blow port 18 that is connected to a air compressor (not shown) so that at substantially the same time as the constant produced angle is being formed the particles of the particle course on the side facing the constant produced angle slope thus formed can be removed by blowing. The constant produced angle can be formed in various ways, such as by pressing down on the particles, or by a shaping action effected by moving the forming member horizontally, or by a combination of these methods. While it is preferable for the height of the formation member to be about equal to the thickness of the course of supplied particles, any configuration may be used that enables a constant produced angle slope to be formed. Moving the formation member 11 through the particle course can be facilitated by affixing an upright grip 21 to the front edge of the angle of repose smoothing portion 12.

As the constant produced angle slope 8 stabilizes the wall in the particle course defining the cavity 9, the charging of the cavity 9 with a different type of dry particles does not have to be done immediately. Particles can be charged by hand or by mechanical means. The method and timing of the charging can be decided based on work efficiency considerations and the like. Another particle supply port may be affixed to the vertical portion of the formation member to which a suction port or blow port has been attached, and the different type of particles fed to the supply port from a particle supply tank connected to the supply port by a pipe, or the particles may be supplied by opening the gate of a tank provided directly over the supply port.

Figure 22:
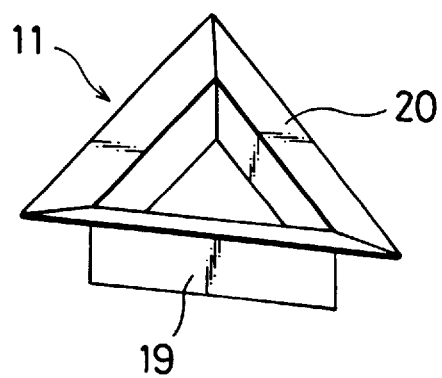
FIG. 22 is a perspective view of an eleventh example of a formation member used in the invention.
Figure 23:
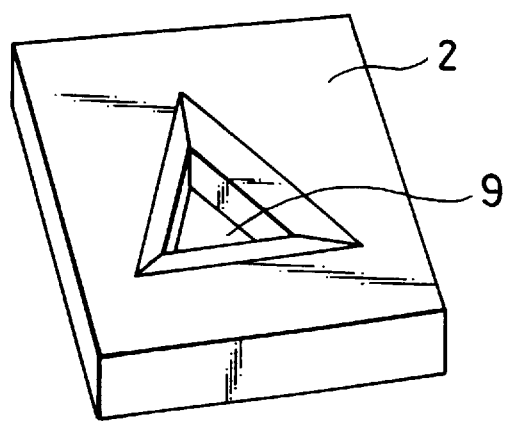
FIG. 23 is a perspective view showing a triangular cavity having a side face with constant produced angle surface, formed in the particle course by the formation member of FIG. 22 in order to form the shaped article of FIG. 9.
Figure 24A:
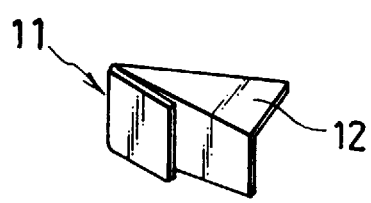
FIGS. 24(a) and (b) are perspective views of a twelfth example of a formation member used in the invention, with FIG. 24(a) showing the formation member with one part folded over and FIG. 24(b) showing the formation member with one part opened out.
Figure 24B:
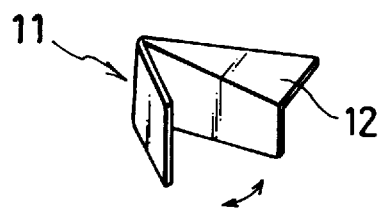

The triangle-patterned shaped article shown in FIG. 9 is formed in accordance with a second method of the invention by using the formation member 11 shown in FIG. 22, comprising a triangular section 19 provided around the upper edge with a flange 20 that extends outward with an upward inclination. The formation member 11 is pressed down into a course of dry particles 2 formed on a base surface on the bottom plate of a form 1. The downward pressure thus exerted on the surface of the particle course by the flange 20 forms a constant produced angle around the triangular section 19. The particles inside the triangular section 19 are then removed at a suitable time by an appropriate method, after which the formation member 11 is removed. The triangular cavity 9 thus formed with a constant produced angle is charged with a different type of dry particles 3. This completes shaped article constituted as a triangle-patterned dry particle course having the type of section shown in FIG. 16. The particles are then allowed to set into an integral mass, either as they are or after being smoothed and/or overlaid with a backing course, if required. The invention is not limited to the arrangement of this example in which the pattern is produced using a triangular formation member. Instead, different patterns can be expressed by varying the configuration and materials of the formation members, and the way the formation members are pressed onto the base surface and moved. It is preferable to use a constant produced angle formation member whose height is about equal to the thickness of the particle course.

As the static angle slope 8 formed around the cavity stabilizes the particle course, the charging of the cavity 9 with the different type of dry particles 3 does not have to be done immediately. Particle charging can be conducted by hand or by mechanical means. The method and timing of the charging can be decided based on work efficiency considerations and the like.

In all cases, the formation member and the method used for forming the pattern may be freely selected, and can be used in combination with different base surfaces or other auxiliary members to enable the production of shaped articles with various patterns in addition to those described above. The constant produced angle can be formed in various ways, such as by pressing the formation member down on the particles, by a shaping action produced by moving the forming member horizontally, by particle removal methods, or by a combination of these methods.

Various configurations, materials and combinations can be used for the static angle formation member. Suitable materials include metal, ceramic, plastic, rubber, paper, wood, unwoven fabric, woven fabric and other such materials that are hard enough to form an angle of repose in the particles. It is preferable to use a material that ensures close contact between the base surface and the formation member, as this helps to realize sharply defined patterns. While it is preferable for the height of the angle of repose formation member to be about equal to the thickness of the supplied particle course, any configuration may be used that enables a constant produced angle slope to be formed.

The formation member can be configured in various ways in addition to the configuration shown in FIGS. 2 and 12 having an upper cuneiform plate portion bent at 45 degrees. Examples of different configurations include the formation members shown in FIGS. 7 and 17 which has been given a gentle curvature that matches the line of stress of the particle course; the vertically extendible arrangement shown in FIG. 8; the configuration of FIG. 18 in which the formation member of FIG. 12 has also been provided with a portion that scrapes away particles; the configuration of FIG. 19 shaped like the wings of a paper airplane that can form a constant produced angle slope on both sides along the direction of advance; the arrangement of FIG. 20 in which the formation member is equipped with a suction port connected to an aspirator, so that at substantially the same time as the constant produced angle is being formed the particles of the particle course on the side facing the constant produced angle slope thus formed can be removed by suction; and the arrangement of FIG. 21 in which the formation member is equipped with a blow port connected to a air compressor, so that at substantially the same time as the constant produced angle is being formed the particles of the particle course on the side facing the constant produced angle slope thus formed can be removed by blowing. Thus, various configurations may be used in accordance with the shape of the pattern to be formed; for example the triangular configuration of FIG. 10 or FIG. 22 in the case of a triangle, and so forth. The formation member may also be given a variable configuration. One example is the formation member shown in FIG. 24 which has a portion that can be folded flat, or set at a specific angle to function as an auxiliary member. Various other variable configurations and arrangements may be used in addition to this example.

Using a formation member linked to various positioning apparatuses enables patterns to be directly produced from a computer. This enhances productivity, allows patterns to be freely modified, and makes it possible to produce various patterns by controlling the angle and speed of formation members and the supply of particles. End stops 22 such as those shown in FIG. 25 can be provided at the beginning and end points of formation member movement to provide patterns with neat beginnings and ends.

The base surface 7 can be constituted by the bottom plate of a form or a sheet, belt, board or the like, the bottom plate of a double action or other type press, the bottom plate of a form placed on a conveyor, or a belt conveyor or other such endless surface. The particle course can be placed on a board, sheet or other such base surface either as it is or inverted. Although the base surface can be of any material, it is preferable to use something having a slightly uneven surface, as this will help to prevent slippage between the bottom plate (base surface) and particle courses and masses. As such a base surface material having a slightly uneven surface, it is also preferable to use rubber, sponge, paper, unwoven fabric or other somewhat bulky or elastic material. This is because when a formation member is pressed onto a base surface formed of such a material the bulk or elasticity of the material can absorb play between the base surface and the formation member. This facilitates vertical positioning of the formation member and enhances its particle clearing performance, enabling sharper pattern lines. A similar effect can also be obtained by pressing all or part of the formation member with a spring or an elastic body made of rubber or the like or by attaching thread, string or other such elastic material to the base surface portion contacted by the angle of repose formation member. It is also preferable that the unwoven fabric, woven fabric, paper or the like used for the base surface is gas-permeable, liquid-permeable, and also liquid-absorbent as this assists deaeration, thereby removing excess liquid and ensuring the shaped article is of uniform strength.

In all arrangements, the operating movement of the formation member can be done by hand, by mechanical means or by using a positioning apparatus such as a robot. If necessary, the formation member may be equipped with auxiliary members. In any of the arrangements a dry particle course can be formed by various methods such as a squeegee type course forming method, or by using a sliding supply tank, or by using a supply tank with a slitted nozzle, or a rotary feeder, or by employing a dense cellular body, bristling body or the like.

In all arrangements, the charging of particles after formation may be conducted by any method. The formation of the constant produced angle has the effect of stabilizing particle masses and courses, and as such, provides a much greater degree of freedom in choosing when to do the charging. Charging may be done by hand, or using mechanical means. For example, he particles can be supplied from a particle source tank to a supply port affixed to the angle of repose formation member, via a pipe linking the tank and the supply port, or from a tank disposed directly over the supply port which can be opened by a gate. Particles can also be supplied in fixed amounts by a pipe conveyor or the like, or by using compressed air or other such method.

In any of the arrangements, the press plate below a double action press can be used as the base surface, and after a pattern has been formed on the press plate, the particles can be pressed into a solid mass with the press. In addition, a plurality of patterned shaped articles can be set as one large one which is later cut into individual articles.

In the method of the present invention, dry particle material is used for forming a course on the base surface. Although the material is dry, it may have absorbed one or more of water, oil lubricant-bonding agent, solvent, setting agent and plasticizer, if it is not kneaded with water, oil, lubricant-bonding agent, solvent, setting agent or plasticizer and is in a dry state readily amenable to pulverization for supply to the base surface. On the other hand, the material of which the backing layer is formed may be either dry or wet with one or more of water, oil, lubricant-bonding agent, solvent, setting agent and plasticizer. Otherwise, a plate of metal, wood, cement, glass or ceramic or a sheet of paper, unwoven fabric, woven fabric, knit fabric, plastic, etc. may be used as the backing layer. In this case, the plate or sheet serves as the base surface. In addition, any other existing shaped article may be used as a base surface to be formed with a course that is set together therewith.

The materials to be supplied may differ from one another depending on the shaped article to be produced. Otherwise, in the finished state they are required to differ from one another in color, luster, texture and the like.

In producing a concrete shaped article, the course material is dry and consists mainly of cement powder, resin or a mixture thereof and may additionally include at least one of a pigment and fine aggregates. The material for a backing layer consists mainly of cement powder, resin or a mixture of cement powder and resin, the mixture further containing a fine aggregate and, if necessary, additionally containing a pigment and at least one of coarse aggregates and various kinds of fibers. The backing material may either be dry like the course material or in the form of a concrete slurry obtained by kneading with water etc.

Both the materials for the course and the material for the backing layer may additionally include wood chips as aggregates or fine aggregates and may further include as blended therewith crushed or pulverized granite, crushed or pulverized marble, slag, light-reflecting particles, inorganic hollow bodies such as Shirasu balloons, particles of ceramics, new ceramics, metal, ore or other substances. They may also contain as additives a congealing and curing promoter, a waterproofing agent, an inflating agent and the like. The aforementioned various kinds of usable fibers include metal fibers, carbon fibers, synthetic fibers, glass fibers and the like.

All the materials are supplied to a form etc. and are allowed to set into an integral mass. Otherwise after the material has been supplied, a prescribed amount of water is supplied to all portions of the interior of the form etc., thereby setting the materials into an integral mass within the form etc. If a wet material is used for the backing layer, the amount of water supplied is reduced in view of the water contained in the wet material. When a plate of material, wood, cement, glass or ceramic or a sheet of paper, unwoven fabric, woven fabric or knit fabric is used as the backing layer, for example, it can be allowed to set integrally with the course. An asphaltic concrete shaped article can be produced using a thermal fusion material such as asphalt.

In producing an artificial stone shaped article, the dry materials for the course may, for example, the constituted of at least one of rock particles, ceramic particles, new ceramic particles, glass particles, plastic particles, wood chips and metal particles and may, as found necessary, further have mixed therewith a pigment etc. Also, the material for the backing layer may, for example, be constituted of at least one of rock particles, ceramic particles, new ceramic particles, glass particles, plastic particles, wood chips and metal particles and may, as found necessary, further have mixed therewith a pigment etc. The material for the backing layer may be either dry or wet. The wet material for the backing layer contains a setting agent. The setting agent contained in the wet material for the backing layer or a setting agent for setting the dry materials for the course and/or the dry material for the backing layer is composed mainly of a mixture of cement powder and water, a mixture of cement powder, resin and water, a mixture of resin and water, a mixture of resin and solvent, or a mixture of resin, water and solvent and may further contain particles of at least one of rock, ceramic, new ceramic, glass and plastic and may, as found necessary, be kneaded with a pigment or colorant and have mixed therewith various kinds of particles, various kinds of fibers, various kinds of mixing agents and various kinds of additives. The various kinds of particles include particles of slag, fly ash and fine light-reflecting substances. The various kinds of fibers include metal fibers, carbon fibers, synthetic fibers and glass fibers. The various kind of mixing agents and additives include shrink proofing agents, congealing and setting promoters, delaying agents, waterproofing agents, inflating agents, water reducing agents, fluidizing agents and the like.

For enhancing the adherence of the setting agent with the aforementioned dry materials, the dry materials can be sprayed with or immersed in water, solvent or surface treatment agent, but are not kneaded with water, solvent or surface treatment agent and are in a state readily amenable to pulverization.

All the materials can be set into an integral mass within a form etc. by vacuum-suction treatment, centrifugal treatment or other such treatment for spreading the setting agent between adjacent particles or by using a mixture of an aggregate and a setting agent as the material for the backing layer. When a plate of metal, wood, cement, glass or ceramic or a sheet of paper, unwoven fabric, knit fabric, woven fabric or plastic is used as the backing layer, the course can be allowed to set integrally therewith.

For producing a ceramic shaped article or the raw product for a ceramic shaped article, the dry materials for the course are mainly particles of one or more of clay, rock, glass, new ceramic, fine ceramic and glaze with or without a pigment or colorant added thereto. Although the materials are dry, they may be ones which have absorbed some water or been added with a lubricant-bonding agent if they are not kneaded with the lubricant-bonding agent or water and are in a state readily amenable to pulverization. The material for the backing layer is constituted mainly or particles of one or more of clay, rock, glass, new ceramic and fine ceramic and may additionally contain a pigment and a colorant. In the finished state, the backing layer is required to differ from the course in color, luster, texture and the like and may be either dry, similarly to the course, or made wet by kneading with water or a lubricant-bonding agent. In addition, either the materials for the course or the material for the backing layer may have further mixed therewith inorganic hollow bodies such as Shirasu balloons, and particles of ceramic, metal or ore and may have added thereto various kinds of foaming agents, fluidization-preventing agents, supernatant agents, lubricating agents, bonding agents and adherence promoters as additives.

The materials supplied into a form etc. are allowed or caused to set into an integral mass without adding or by adding a predetermined amount of water or lubricant-bonding agent to plasticize them and applying pressure to the resultant mixture. The set integral mass is removed from the form etc. and used as a raw product. The raw product is sintered to obtain a ceramic shaped articles. Otherwise, the materials supplied into a refractory setter or similar form are melted or fused by heating to obtain an integral mass, and the integral mass is removed from the setter. Otherwise, a course of particles is laid on a plate of metal, glass or ceramic and melted or fused by heating to be integral with the plate. A patterned shaped article of enamel, stained glass or crystalline glass and similar patterned shaped articles can be produced by any of these methods.

In producing a raw product to be sintered into a metal shaped article, the dry materials for the course are mainly particles of one or more of metals and alloys and may, as found necessary, further have mixed therewith a lubricant. Although the materials are dry, they may be ones which have absorbed the lubricant if they are not kneaded with the lubricant and are in a state readily amendable to pulverization. The materials for the backing layer are constituted mainly of particles of one or more of metals and alloys and may be either dry or made wet by kneading with a lubricant.

Examples of the lubricant used herein include zinc stearate and other lubricants. The dry materials for the course or the materials for the backing layer may further contain a bonding agent and other additives.

All the materials are supplied into a main form etc., pressed therein and removed therefrom to obtain the raw product for a metal shaped article. The raw material is sintered into a metal shaped article. A metal shaped article may be produced by supplying all the materials onto a sheet of metal, glass, ceramic etc., applying pressure to the resultant composite to obtain an integral mass of raw product, and sintering the integral mass.

The dry materials for the course used in producing a shaped article having an impasto layer are various kinds of powdered paint, and the material for the backing layer is a plate, sheet or the like of metal, wood, cement or ceramic. The various kind of powdered paint include acrylic resin, polyester resin, acrylic-polyester hybrid resin, fluorine resin and similar resins having a pigment or colorant added thereto. The materials for the course are laid on the plate, sheet, etc. as a backing layer, melted and fused by heating and baked to unite all the layers together. In uniting all the layers together, pressure may be applied to the layers. As s result, it is possible to obtain a plate, sheet, etc. having an impasto layer thereon.

In producing a plastic shaped article, the dry materials for the course are constituted mainly of particles of various kinds of plastics and may additionally contain a pigment or a colorant. The materials may also contain a plasticizer or solvent, but are not kneaded with a plasticizer or solvent and are in a state readily amenable to pulverization. The material for the backing layer may be either dry or made wet by kneading with a plasticizer or solvent. The various kinds of plastics include polyethylene, nylon, polypropylene, polycarbonate, acetal, polystyrene, epoxy, vinyl chloride, natural rubber, synthetic rubber, ABS, PPO, EVO, fluorine resin and other thermoplastics and thermosetting resins. Both the materials for the pattern course and the material for the backing layer may, as found necessary, contain a foaming agent, oxidization preventing agent, thermal stabilizer, bridging agent, other additives and particles of inorganic materials and the like. All the materials are melted or fused into an integral mass by heating, while applying pressure thereto, if necessary. With this method, it is possible to produce a patterned shaped article of foaming styrol, a patterned shaped bathtub or floor tiles of plastic, etc. In this case, the layers may be united with a plate of metal, wood, cement, ceramic or a sheet of paper, unwoven fabric, knit fabric, woven fabric or plastic.

In producing confectionery or other shaped foodstuffs, the dry materials for the course are constituted mainly of particles of one or more of wheat, rice, potato, bean, corn and sugar and may additionally contain seasonings and spices. The materials may also contain oil, water, etc., but are not kneaded with oil, water, etc. and are in a state readily amenable to pulverization. The material for the backing layer may be either dry, similarly to the materials for the course, or made wet by kneading with oil, water, etc. Both the materials for the course and the material for the backing layer may, as found necessary, further contain an inflating agent and other additives. All the materials are supplied into a form etc. and are allowed to set or caused to set without adding or by adding water, oil, etc. to plasticize them into an integral mass. The integral mass is pressed and then removed from the form, etc. to obtain a raw product. The raw product is then baked. Otherwise, all the materials are baked within the form etc. With this method, it is possible to produce various patterned baked confectioneries etc. It is also possible to produce a patterned shaped article melted by heating, such as a patterned chocolate shaped article etc., by using particles of the material melted by heating, such as chocolate etc., and fusing the particles by heating.

The materials that can be used in the present invention are not limited to those set out as examples herein and various other materials can also be used depending on the shaped article to be produced. Moreover, the range of patterned shaped articles that can be produced can be increased by combining various materials that, in the finished state, differ in property, color, luster, texture and the like. When the methods described above have the steps in common with each other, different kinds of materials can be combined with each other. For example, since both the method for producing a metal shaped article and the method for producing a ceramic shaped article require a common sintering step, metal particles and ceramic particles are used together to form a pattern, whereby cloisonne ware can be produced. The materials used in the method for producing a concrete shaped article and those used in the method for producing an artificial stone shaped article can also be used together.

In the method for producing any of the patterned shaped articles, it is desirable to apply vibration when the materials are supplied onto the base surface so as to ensure smooth movement of the materials. Further, by rubbing with a brush or comb or applying a jet of air or water to the boundary portion between the different kinds of materials for the course, the pattern can be blurred.

In addition, by providing on the base surface or material course a mat of unwoven fabric, paper or other water or oil absorbing material, any excess amount of water, oil, lubricant-bonding agent, plasticizer or solvent can be supplied to any portion deficient in them to uniformly disperse them in the shaped article. As a result, the ratio of the water (auxiliary agents) in the surface to the cement (resins) becomes small and this means that the strength of the shaped article as a whole is enhanced. When an air permeable mat is used in the formation of an article under pressure, degassing is enhanced to obtain a dense article. By vibrating or pressing one or both of the material course and the backing layer when the two layers are being allowed to set into an integral article, the integral article obtained becomes dense and is improved in strength. The article may be reinforced with long fibers, short fibers, wire nets or reinforcing rods by inserting these in or between the two layers. The method of using an article obtained by the sheet making method or extrusion molding method or any of various plates or sheets as the backing layer is applicable to the production of various articles including architectural panels and boards, wall sheets and tiles. The surface of an existing concrete article can be used as the base surface. In this case, the materials for the material course are discharged onto the concrete surface and set to be integral with the existing concrete article.

In either of the methods of producing a shaped article according to this invention, it is possible to produce a shaped article with a curved finished surface by using a deformable mat as the base surface or using a partially or generally deformable form.

With the method of this invention, it is possible to use simple members to freely produce clearly defined patterns that previously could only be formed using auxiliary forms and the like. The formation of the constant produced angle slope stabilizes particle courses, which provides a much greater degree of freedom with respect to the timing of the charging, and with respect to charging randomly blended particles, this ability to choose the timing makes possible a wide range of pattern expression.

An effect of the second method of the invention is that since the particle course is formed first, productivity is enhanced since patterns can be expressed by the straightforward operations of formation of a constant produced angle particle removal and particle charging, obviating the need for pattern-specific charging and thereby greatly reducing the amount of charging work and the like that is required. As a further effect, the invention enables formation of cavity patterns in randomly blended particle courses, making it possible to produce patterns within a complex background.

In both cases, patterns can be directly produced from a computer. This enhances productivity, allows patterns to be freely modified, and makes it possible to produce various patterns by controlling the angle and speed of formation members and the supply of particles. These production methods make it possible to easily produce concrete shaped articles, artificial stone shaped articles, raw products for sintering into ceramic shaped articles, ceramic shaped articles, metal shaped articles, impasto shaped articles, plastic shaped articles and shaped foodstuffs including confectionery each having a pattern formed on part or all of the surface thereof. The good condition of the patterns of the patterned shaped articles can therefore be maintained even when exposed to surface abrasion. Since the pattern course is formed by a combination of various kinds of dry materials, the materials can, owing to their cave-in action, be densely charged without any gaps and the boundaries between adjacent materials can be finely expressed, resulting in clear-cut pattern formation.

We claim:

1. A method of producing a patterned shaped article, comprising the step of:

supplying a sufficient amount of first particles onto a position on a base surface corresponding to a pattern to be formed;

applying sufficient pressure to an angle formation member to form the particles into a shaped mass as a continuous particle course corresponding to the pattern to be formed having section with an essentially constant produced angle between a top face and a side face of the particle course;

supplying a prescribed amount of second particles onto a remaining portion of the base surface; and setting all the particles into an integral mass.

2. A method of producing a patterned shaped article, comprising the steps of:

supplying a sufficient amount of first particles onto a position on a base surface corresponding to a pattern to be formed;

applying sufficient pressure to an angle formation member to form the particles into a shaped mass as a continuous particle course corresponding to the pattern to be formed having a section with an essentially constant produced angle between a top face and a side face of the particle course;

supplying a prescribed amount of second particles onto a remaining portion of the base surface;

overlaying an obtained particle course with a backing course; and setting the obtained particle course and the backing course into an integral mass.

3. A method of producing a patterned shaped article, comprising the steps of:

forming a first particle course on a base surface;

inserting an angle formation member in the particle course and applying sufficient pressure to the angle formation member to form at a portion of the particle course a section corresponding to a pattern to be formed having an essentially constant produced angle;

removing the particle course on a side facing said section to form a cavity;

charging the cavity with second particles; and setting all the particles into an integral mass.

4. A method of producing a patterned shaped article, comprising the steps of:

forming a first particle course on a base surface;

inserting an angle formation member in the particle course and applying sufficient pressure to the angle formation member to form at a portion of the particle course a section corresponding to a pattern to be formed having an essentially constant produced angle;

removing the particle course on a side facing said section to form a cavity;

charging the cavity with second particles;

overlaying an obtained particle course with a backing course; and setting the obtained particle course and the backing course into an integral mass.

* * * * *

UNITED STATES PATENT AND TRADEMARK OFFICE
CERTIFICATE OF CORRECTION

PATENT NO. : 5,855,952
DATED : January 5, 1999
INVENTOR(S) : Hiroshi UCHIDA et al.

It is certified that error appears in the above-identified patent and that said Letters Patent is hereby corrected as shown below:

On the title page, item [63], the Related U.S. Application Data should read:

--Continuation of Ser. No. 424,383, filed as PCT/JP94/01435, Aug. 31, 1994, published as WO95/06551 Mar. 9, 1995, abandoned.--

Signed and Sealed this

Twenty-ninth Day of June, 1999

Attest:

Q. TODD DICKINSON

*Attesting Officer*     *Acting Commissioner of Patents and Trademarks*